(12) United States Patent
Yurgevich

(10) Patent No.: US 7,798,753 B2
(45) Date of Patent: Sep. 21, 2010

(54) CARGO CONTAINER WITH PERIPHERAL WALL STRUCTURE REINFORCED BY SIDE POST ASSEMBLIES

(75) Inventor: Howard Yurgevich, Chula Vista, CA (US)

(73) Assignee: Hyundai Translead, San Diego, CA (US)

( * ) Notice: Subject to any disclaimer, the term of this patent is extended or adjusted under 35 U.S.C. 154(b) by 566 days.

(21) Appl. No.: 11/713,882

(22) Filed: Mar. 5, 2007

(65) Prior Publication Data

US 2008/0219796 A1 Sep. 11, 2008

(51) Int. Cl.
*B60P 7/08* (2006.01)
(52) U.S. Cl. ............... 410/115; 410/108; 410/113; 296/191
(58) Field of Classification Search ........... 410/115, 410/116, 113, 106, 108, 112, 109; 296/186.1, 296/191; 52/309.2, 578, 582.1, 584.1
See application file for complete search history.

(56) References Cited

U.S. PATENT DOCUMENTS

| | | | |
|---|---|---|---|
| 4,810,027 A | 3/1989 | Ehrlich | |
| 5,058,756 A | 10/1991 | Green | |
| 5,066,066 A | 11/1991 | Yurgevich | |
| 5,439,266 A | 8/1995 | Ehrlich | |
| 5,584,252 A | 12/1996 | Smith et al. | |
| 5,700,118 A * | 12/1997 | Bennett et al. | 410/113 |
| 6,003,932 A | 12/1999 | Banerjea et al. | |
| 6,527,335 B1 | 3/2003 | Yurgevich | |
| 6,652,019 B1 | 11/2003 | Bennett | |
| 6,832,808 B1 | 12/2004 | Bennett | |
| 6,959,959 B1 | 11/2005 | Roush | |
| 2002/0010095 A1 | 8/2002 | Gosselin et al. | |
| 2005/0161977 A1 | 7/2005 | Fenton et al. | |

* cited by examiner

*Primary Examiner*—Stephen Gordon
(74) *Attorney, Agent, or Firm*—Wood, Phillps, Katz, Clark & Mortimer

(57) ABSTRACT

A cargo container having a floor and a peripheral wall structure and including a plurality of side post assemblies. Each side post assembly has a body with a vertically extending length. The body of each side post assembly is secured at the outside surface of at least one of the panels. Each side post assembly further has a reinforcement plate with oppositely facing first and second surfaces. The first surface is facially abutted to the outside surface of the at least one panel. The body of the side post at least partially overlies the reinforcement plate. A logistics slot is formed in one of the side post assemblies.

19 Claims, 9 Drawing Sheets

CARGO CONTAINER WITH PERIPHERAL WALL STRUCTURE REINFORCED BY SIDE POST ASSEMBLIES

BACKGROUND OF THE INVENTION

1. Field of the Invention

This invention relates to cargo carrying containers and, more particularly, to a cargo carrying container with a peripheral wall structure that extends around a cargo storage space and has panels that are reinforced by side post assemblies.

2. Background Art

Over the years, a multitude of designs has been developed for peripheral wall structures on cargo carrying containers, for either single, or multi-model applications. Designers of these cargo carrying containers seek to optimize the volume of the cargo storage space within the constraints imposed by governmental agencies that regulate this industry. This space maximization must not be carried out so as to significantly compromise the integrity of the cargo container. The peripheral wall structures must be designed to withstand vertical, transverse and lateral loading forces that may be encountered in many different environments and under many different conditions.

It is well known to construct a cargo container with a peripheral wall structure between upper and lower rail assemblies to produce a cubicle cargo space. The upper and lower rail assemblies are respectively integrated into roof and floor assemblies and tend to maintain the overall squared shape of the cargo container.

In use, the cargo container is subjected to a number of different static and dynamic forces. The weight of the roof assembly is borne by the peripheral wall structure. In the event that the cargo container is mobilized through a wheeled carriage or provided with a support, as for cooperating with a rail car, loading is imparted through the carriage, a coupler assembly for drawing the cargo container and landing gear aft of the coupler assembly, and through any frame designed for support upon a rail car.

In addition to the aforementioned vertical loads, non-vertical loading forces are imparted to the peripheral wall structure by wind, shifting of cargo, and bending/distortion as the cargo container is transported, be it upon its own carriage or upon a rail car. Additionally, non-vertical forces are imparted by reason of applying anchoring forces through the peripheral wall structure to the cargo within the storage space, to prevent shifting thereof.

It is well known to construct peripheral wall structures with a plurality of flat panels, joined edge-to-edge or in lapped relationship to produce a continuous shape. At regularly spaced intervals, including at locations at which the panel edges are butted or lapped, vertically extending, elongate side post assemblies are utilized. Commonly, the side post assemblies are made from steel sheet material that is formed to produce a generally "U" shape defined by a base and spaced, parallel legs. The legs have outturned flanges through which the side post assemblies are secured to one or more panels at strategically selected locations.

The nature of the wall panels, the side post assemblies, and their interaction, dictates the overall strength and integrity of the peripheral wall structure. The depth of the side post assemblies also determines in good part the degree of their rigidity and ability to resist flexing under loading. Generally, the deeper the "U", the more resistant the side post assemblies are to bending. However, by increasing the depth of the side posts, the cargo space is reduced correspondingly, whether the side posts are either interiorly or exteriorly located. At the spaced side walls, the loss of volume due to this increase in depth is doubled.

Consequently, it is preferred to make the depth of the "U" as small as possible without adversely compromising integrity. The loss of strength due to the reduced depth can be compensated for to a certain extent by increasing the strength of the material making up the side post assemblies and the panels. While increasing the thickness of the panels and side post assemblies does add strength, it also adds weight to the overall container, which translates into lost revenue by reason of increased loading on the towing equipment and thereby increased fuel consumption. Increasing strength by using steel in place of aluminum also detrimentally adds weight.

Thus, the industry has devised numerous different configurations of side post assemblies that potentially allow lighter gauge materials to be used for the side post assemblies and panels.

Another consideration in the design of the peripheral wall structure is the provision of logistics slots, which are a common specification to provide a method for attaching various cargo control devices and double-decking load bars. In designs wherein the side posts are exteriorly located, the capacity of the region around the slots is dictated by the strength of primarily the panels. Designers have generally been required to balance between strength and weight reduction. That is, thicker panel design affords greater capacity for the cargo control devices. However, this adds considerably to the overall weight of the cargo carrying containers and also reduces usable volume. A failure of the structure around one or more of the logistics slots may require extensive repair, that may be a localized patching of the region around the failed slot or, in a worst case, replacement of an entire panel or even multiple panels.

The region of the panels around the logistics slots may be strengthened by providing more robust exteriorly mounted side posts. This is generally accomplished by using heavier gauge materials or by changing the configuration of the posts to provide a deeper "U" shape. The former accounts for added weight with the latter reducing internal storage space.

The industry continues to seek out new designs of side post assemblies that produce an effective balance between strength, weight control, and maximization of storage space.

SUMMARY OF THE INVENTION

In one form, the invention is directed to a cargo container having a floor and a peripheral wall structure extending upwardly from the floor and bounding a cargo storage space. The peripheral wall structure includes a plurality of side post assemblies. The peripheral wall structure further includes a plurality of panels, each having an inside surface facing the cargo storage space, and an oppositely facing outside surface. Each side post assembly includes a body with a vertically extending length. The body of each side post assembly is secured at the outside surface of at least one of the panels. Each side post assembly further includes a reinforcement plate with oppositely facing first and second surfaces. The first surface is facially abutted to the outside surface of the at least one panel. The body of the side post at least partially overlies the reinforcement plate. A logistics slot is formed in one of the side post assemblies.

In one form, a logistics slot is formed through the at least one panel and the reinforcement plate.

In one form, the body has a "U" shape as viewed in cross section taken transversely to the length of the body and includes: a) a base with a width between laterally spaced first and second ends; b) first and second legs projecting respectively from the first and second base ends; and c) first and second flanges projecting laterally oppositely respectively from the first and second legs. The base and first and second legs cooperatively define the "U" shape that opens towards the at least one panel.

In one form, the reinforcement plate resides within the width of the base and is not engaged by the body.

In an alternative form, the reinforcement plate has a width greater than the width of the base and is captive between the first and second flanges and the at least one panel.

In one form, there is a single piece of metal that is formed to define the base, the first and second legs, and the first and second flanges.

The single piece may be made from aluminum, with the reinforcement plate made from steel.

In one form, the at least one panel has a first thickness and the reinforcement plate has a second thickness that is greater than the first thickness.

The second thickness may be on the order of 16 to 18 gauge.

In one form, the reinforcement plate is secured to the at least one panel by one of: a) welding; b) discrete securable fasteners; and c) an adhesive.

The reinforcement plate may extend over only a portion of the length of the body.

Alternatively, the reinforcement plate extends over substantially the entire length of the body.

In one form, there are a plurality of reinforcement plates that are spaced along the length of the body.

The body may be secured to the at least one panel by a plurality of discrete, securable fasteners.

In one form, a sealing component is provided between at least one of: a) the reinforcement plate and the at least one panel; and b) the body and the reinforcement plate.

The at least one panel may consist of first and second panels overlapped at a joint, with the first flange secured at the joint.

In another form, the at least one panel consists of first and second panels overlapped at a joint and the reinforcement plate is captive between: a) the first panel; and b) the second panel and first flange at the joint.

A sealing component may be provided between the reinforcement plate and second panel.

In one form, the cargo container has a wheeled carriage beneath the floor.

The cargo container may be provided in combination with a powered towing component to move the cargo container.

DETAILED DESCRIPTION OF THE DRAWINGS

The environment for the present invention is described fully in U.S. Pat. No. 7,066,529, entitled "Cargo Carrying Container With Peripheral Wall Structure Incorporating A Corrugated Sheet", which is incorporated herein by reference.

Figure 1:
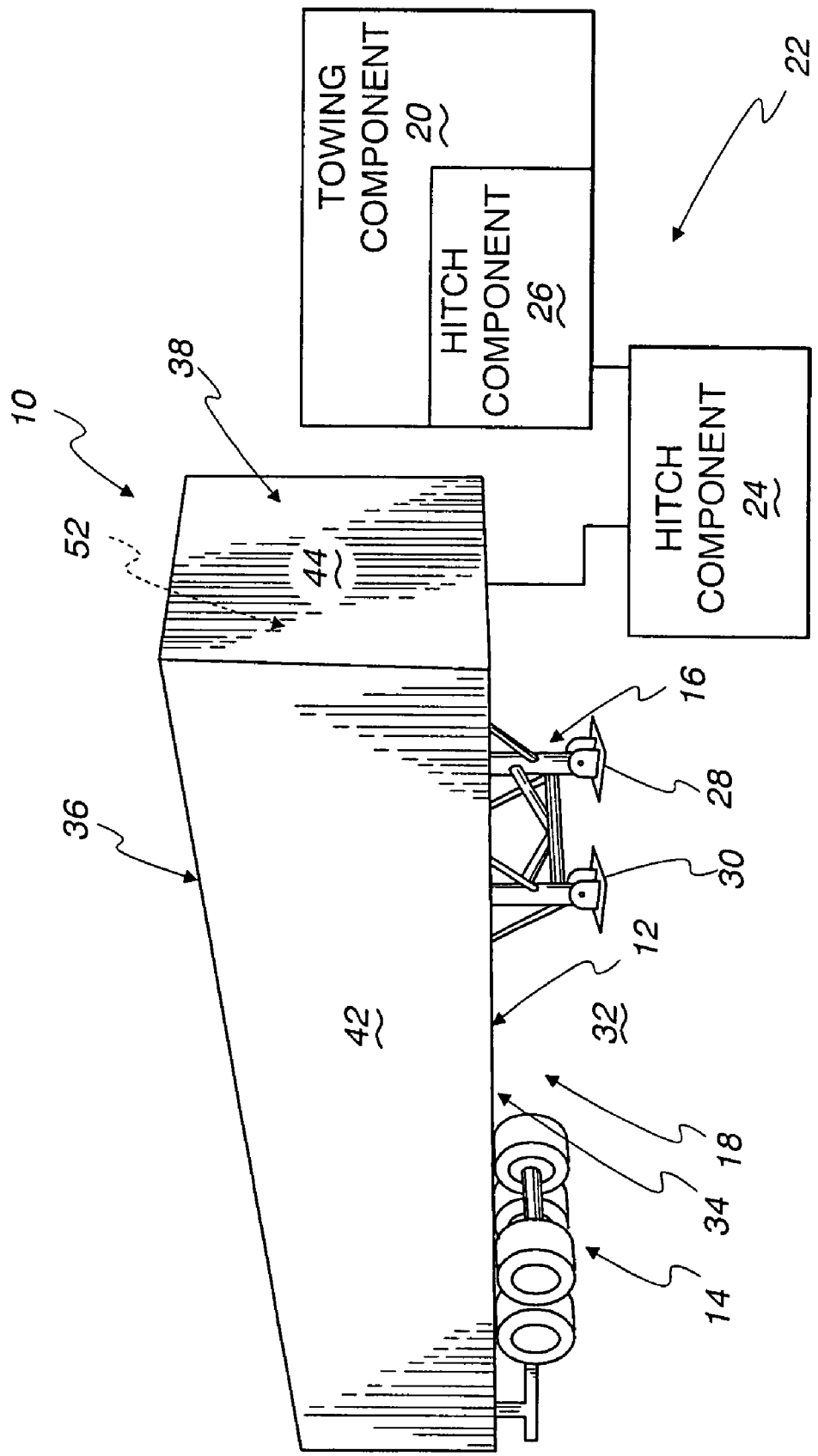
FIG. 1 is a front and side perspective view of a semi-trailer/van incorporating a cargo container with a peripheral wall assembly and connected to a towing component depicted in a schematic form, according to the present invention.
Figure 2:
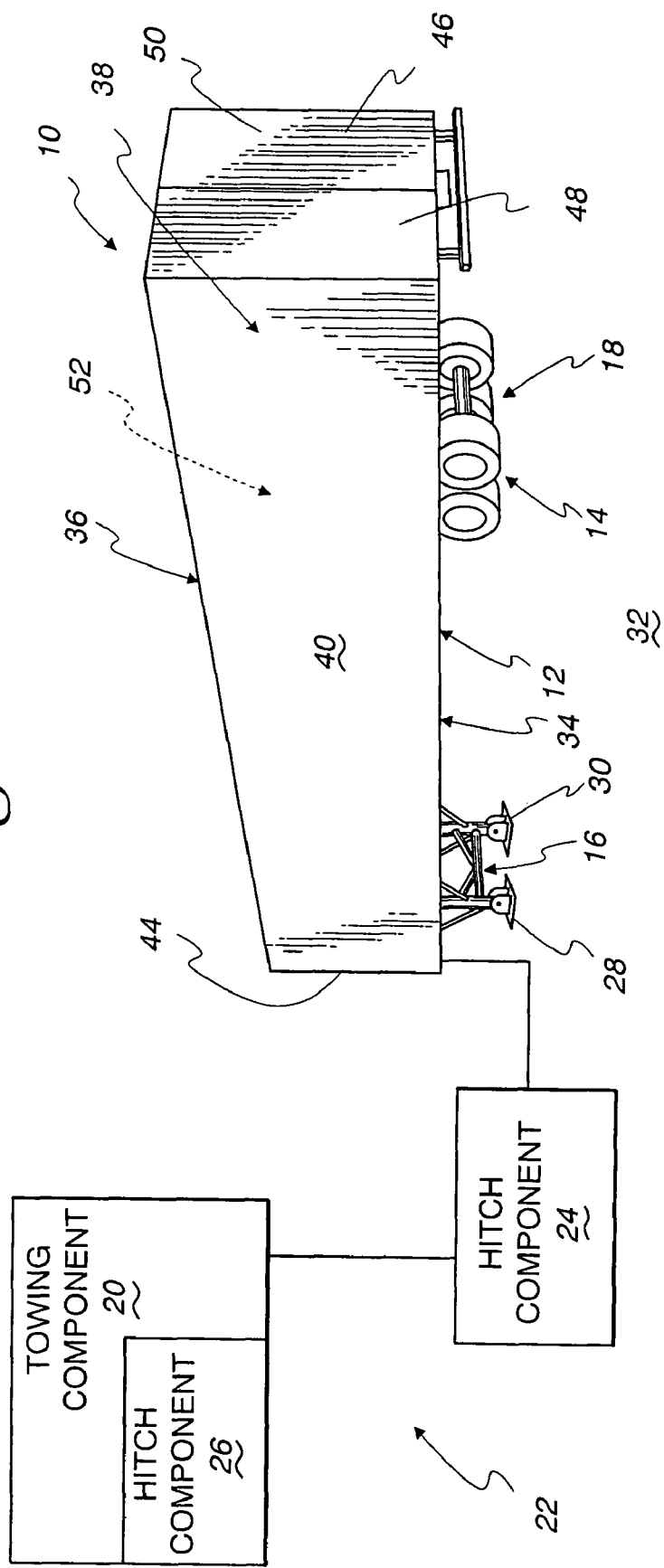
FIG. 2 is a perspective view of the semi-trailer/van and towing component in FIG. 1 taken from the rear and the side opposite that in FIG. 1.
Figure 3:
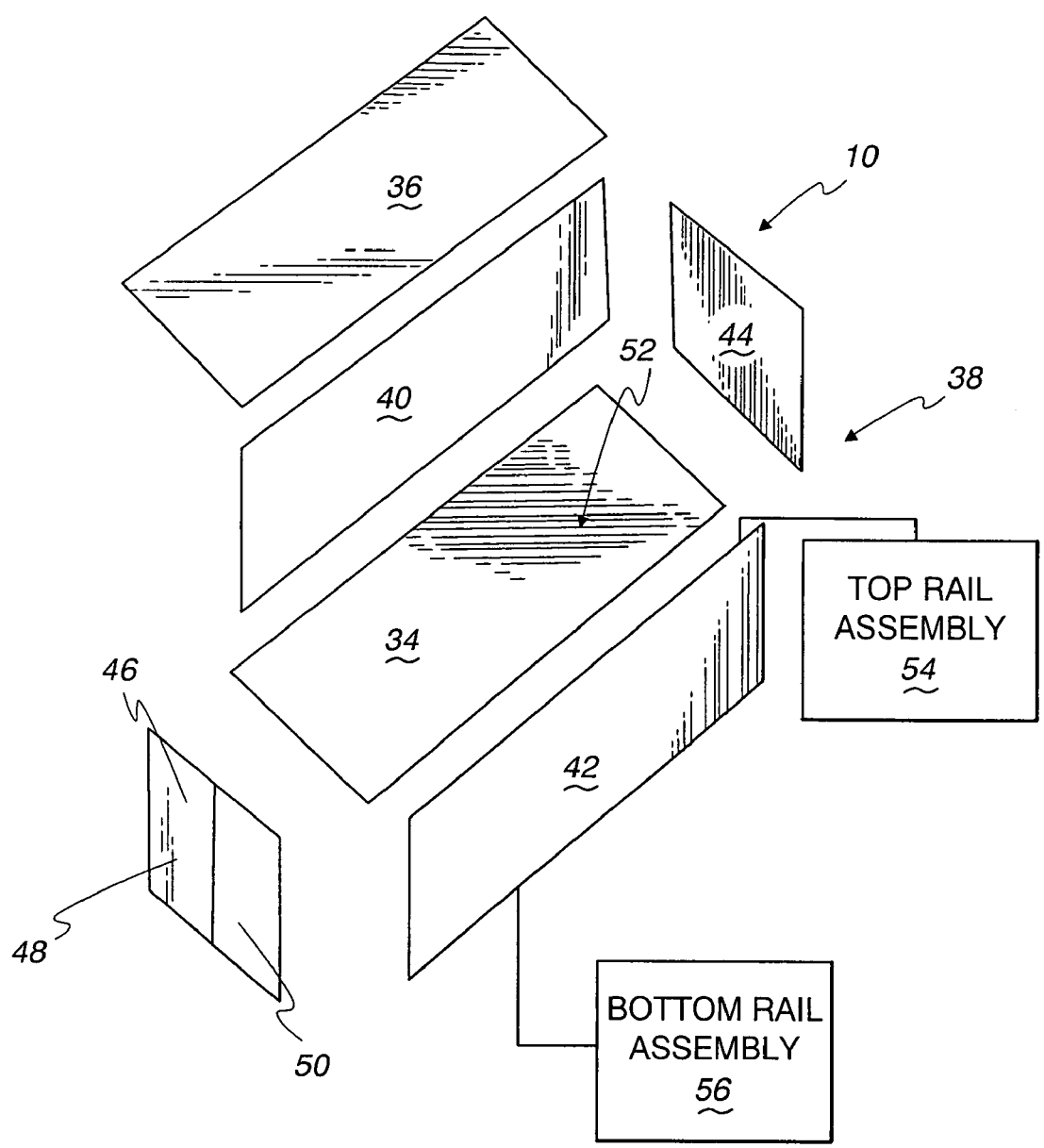
FIG. 3. is an exploded, schematic, perspective view of the cargo container on the semi-trailer/van in FIGS. 1 and 2 and showing the peripheral wall assembly constructed with spaced side walls, a front wall, and a rear wall.

Referring initially to FIGS. 1-3, one form of cargo container, according to the present invention, is shown at 10. In FIGS. 1 and 2, the cargo container 10 is integrated into a chassis 12 consisting of an aft, tandem wheel carriage at 14, and a fore landing gear at 16. The combined cargo container 10 and chassis 12, shown at 18, are commonly referred to as a semi-trailer/van.

The semi-trailer/van 18 is conventionally transported in an over-the-road application by a towing component 20, commonly referred to as a truck tractor or trailer/cab. The towing component 20 is releasably connectable to the cargo container 10 through a hitch assembly at 22, consisting of joinable hitch components 24, 26, respectively on the semi-trailer/van 18 and towing component 20. With the semi-trailer/van 18 separated from the towing component 20, support legs 28, 30 bear on an underlying support surface 32 to maintain the semi-trailer/van 18 in the operative orientation shown in FIGS. 1 and 2.

The cargo container 10 is made up of three different assemblies: a) a floor assembly 34; b) a roof assembly 36; and c) a peripheral wall structure 38. The peripheral wall structure 38 in turn is defined by spaced side walls 40, 42, a front wall 44, and a rear wall 46. The rear wall 46 includes hinged doors 48, 50, which can be opened and closed to selectively permit and block access to a cargo storage space at 52, bounded cooperatively by the floor assembly 34, roof assembly 36, side walls 40, 42, front wall 44, and rear wall 46.

The exemplary side wall 42 has a top rail assembly 54 and a bottom rail assembly 56 through which the side wall 42 is connected respectively to the roof assembly 36 and floor assembly 34. Like rail assemblies (not shown) can be used to connect each of the side wall 40, front wall 44, and rear wall 46 to the roof assembly 36 and floor assembly 34.

Figure 4:
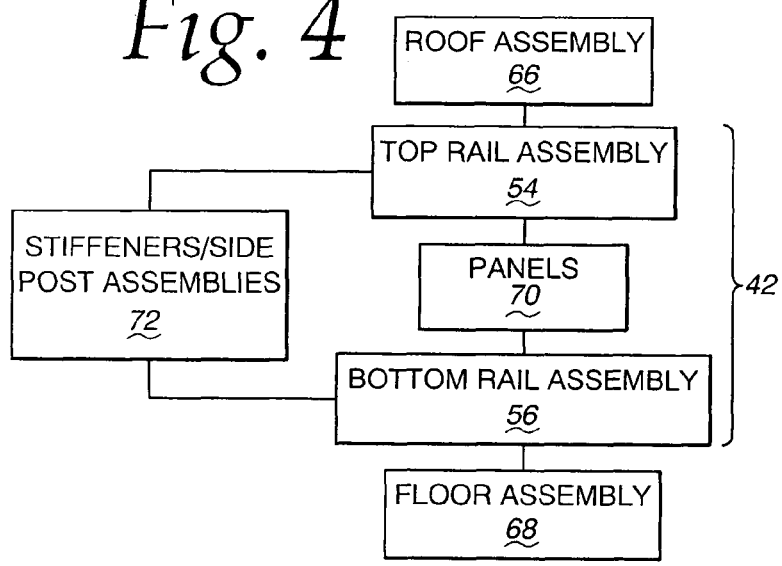
FIG. 4 is a schematic representation of one of the exemplary side walls in FIG. 3 and with the inventive side post assemblies incorporated therein.

As shown in schematic form in FIG. 4, the exemplary side wall 42 consists of the top rail assembly 54 and bottom rail assembly 56. The top rail assembly 54 connects the side wall 42 to a roof assembly 66. The bottom rail assembly 56 connects the side wall 42 to a floor assembly 68. Panels 70 connect between the top and bottom rail assemblies 54, 56. The panels 70 are butted edge-to-edge, or overlapped at their edges at joints to span the exposed internal and external surfaces on the side wall the 42, thereby to define the "skin" on the side wall 42. Stiffeners/side post assemblies 72 extend between the top and bottom rail assemblies 54, 56 and are provided at regular intervals to reinforce the panels 70.

The side wall 42 is shown in schematic form in that the various components thereof may take virtually an unlimited number of different forms. For example, the precise configuration of the stiffeners/side post assemblies 72 is not critical to the present invention. Further, the nature of the panels 70, and their manner of interconnection, is likewise critical to the present invention. Still further, the structural details of the roof and floor assemblies 66, 68, and top and bottom rail assemblies 54, 56 may vary widely. Exemplary designs for a number of these components are shown in greater detail in U.S. Pat. No. 7,066,529, the drawings and associated description thereof which are herein incorporated by reference.

One exemplary form of the side wall 42, according to the invention, is shown in FIG. 5-14. The side wall 42 consists of one, or a plurality, of the panels 70. While a single panel 70 could be utilized, it is common for multiple panels 70 to be used. The lateral edges thereof can be butted or lapped, as explained in greater detail hereinbelow. Each panel 70 has an inside surface 74 facing into the cargo storage space 52 and an oppositely facing, outside surface 76. The panels 70 have a uniform thickness T (FIG. 6) and are normally constructed from a metal material, such as aluminum.

Figure 5:
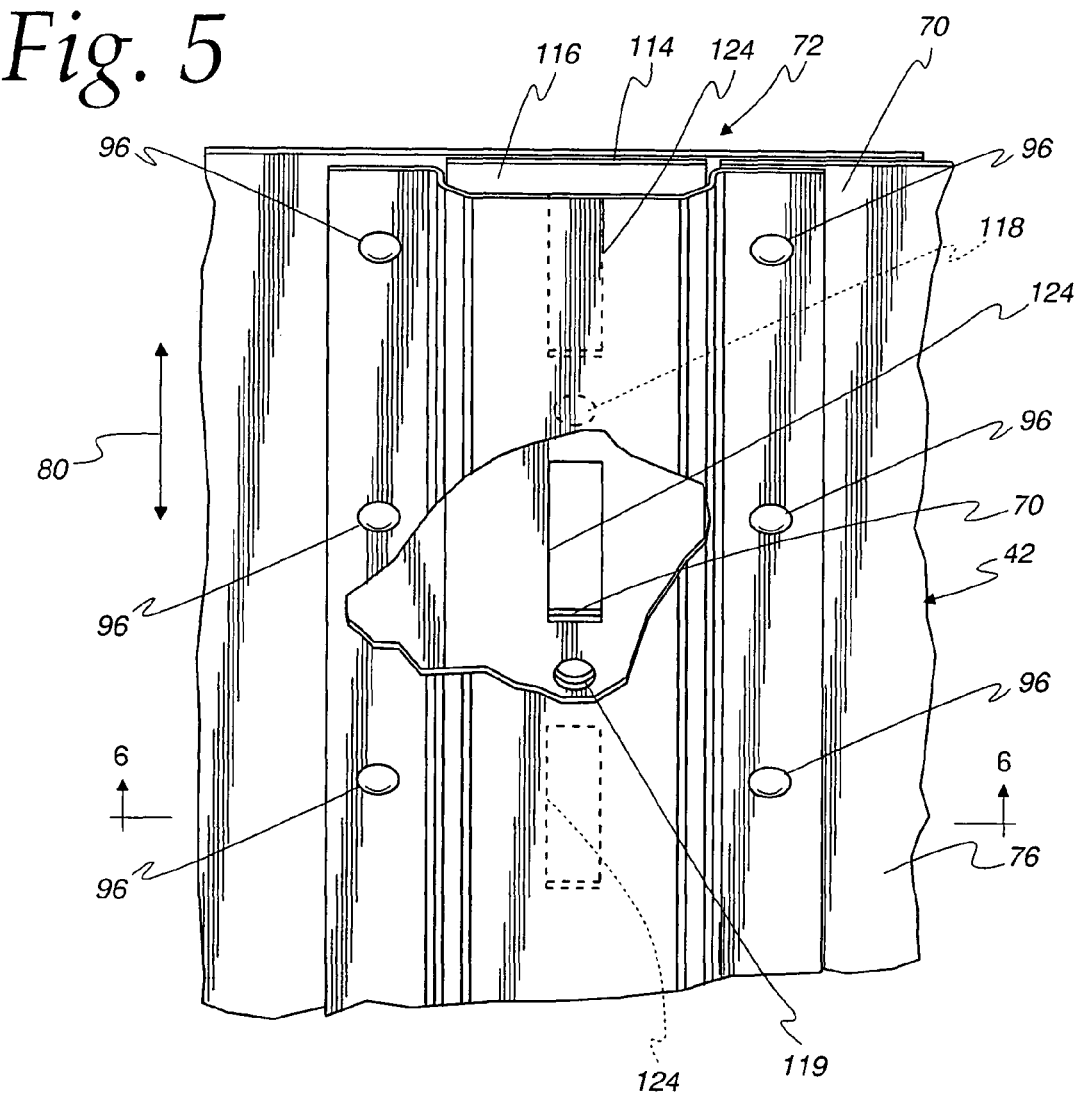
FIG. 5 is a fragmentary, perspective view of the outside of the side wall with the inventive side post assembly thereon and including a body and reinforcement plate attached to the outside of panels that are lapped.

The stiffeners/side post assemblies 72 (hereinafter "the side post assemblies") each has a body 78 with a length extending vertically in the direction of the double-headed arrow 80 in FIG. 5. The body 78 is preferably made from a single piece of formed metal, that may be steel, but is more preferably a lighter weight metal, such as aluminum.

The body 78 has "U" shape as viewed in cross section taken transversely to the length thereof. The body 78 consists of a base 82 with a width W (FIG. 6) between laterally spaced first and second ends 84, 86, respectively. First and second legs 88, 90 project respectively from the first and second base ends 84, 86. The legs 88, 90 and base 82 cooperatively define the "U" shape that opens towards the associated panel(s) 70.

First and second flanges 92, 94 project laterally oppositely, respectively from the first and second legs 88, 90. The flanges 92, 94 are used to secure the body to the panel(s) 70.

Figure 7:
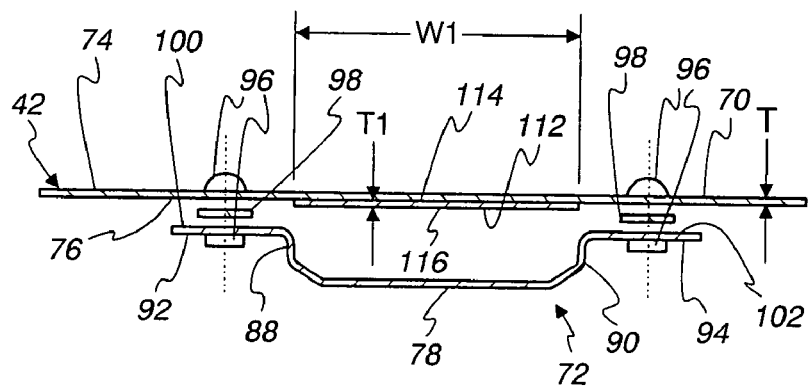
FIG. 7 is a view as in FIG. 6 wherein the side post assembly is provided at a panel region where there is no lapping.
Figure 8:
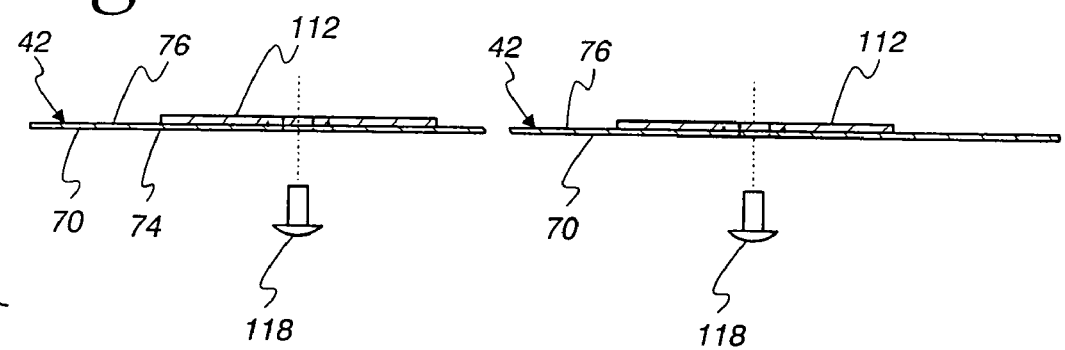
FIG. 8 is a cross-sectional view as in FIGS. 6 and 7 showing the connection of reinforcement plates on adjacent panels.

The side post assemblies 72 are normally mounted in one of three different locations on the panels 70. As shown in FIG. 7, the body 78 is attached at the outside surface 76 of the panel 70 along a continuous extent thereof having the uniform thickness T. Discrete, securable fasteners 96 extend through the flanges 92, 94 and the panel 70 at regular, vertically spaced intervals. The fasteners 96 may be rivets or other type of conventional fastener known to those skilled in the art.

A sealing composition 98 may be interposed between inside surfaces 100, 102, respectively on the first and second flanges 92, 94, and the outside surface 76 of the panel 70 to avoid migration of moisture and foreign material through openings formed to accommodate the fasteners 96. Preferably, the sealing composition 98 extends along the full length of the body 78 so that moisture and foreign material can not migrate between the flanges 92, 94 and the outside surface 76 of the panel 70 over the entire vertical extent of the body 78.

Figure 6:
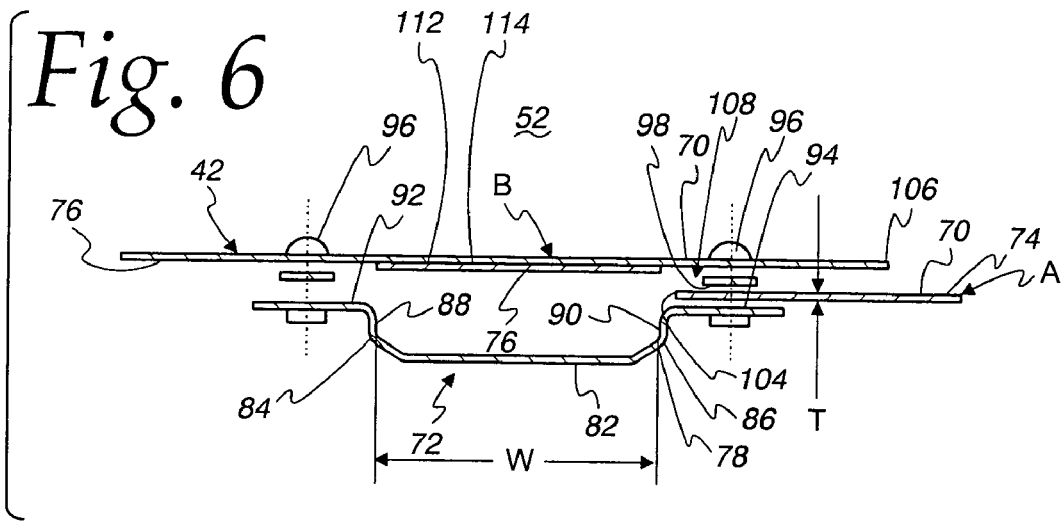
FIG. 6 is an exploded, cross-sectional view of the side post assembly taken along lines 6-6 of FIG. 5.

In FIG. 6, another appropriate mounting location for the side post assembly 72 is shown. In this embodiment, a first panel 70 at A has a lateral edge region 104 that is lapped outside of a lateral edge region 106 on an adjacent panel 70 at B to form a lap joint 108. As in FIG. 7, fasteners 96 are provided at regular, vertically spaced intervals and extend through the second flange 94 and the lapped edges 104, 106 on the panels 70 at A and B. The sealing component 98 is situated to reside captivity between the inside surface 74 of the panel 70 at A and outside surface 76 of the panel 70 at B to perform the same function as previously described for the sealing component 98, as in FIG. 7. A separate sealing component (not shown) may be provided captively between the panel 70 at A and the second flange 94.

The flange 92 is connected to the panel 70 at B through fasteners 96 in the same manner as it is connected in FIG. 7.

The side post assembly 72 further includes a reinforcement plate 112 made preferably from metal, such as steel with a gauge in the 16-18 range. The reinforcement plate 112 is flat and has a substantially uniform thickness T1 (FIG. 7) between oppositely facing, flat inside and outside surfaces 114, 116, respectively. The reinforcement plate 112 is mounted by facially abutting the inside surface 114 to the outside surface 76 of the associated panel(s) 70.

Figure 13:
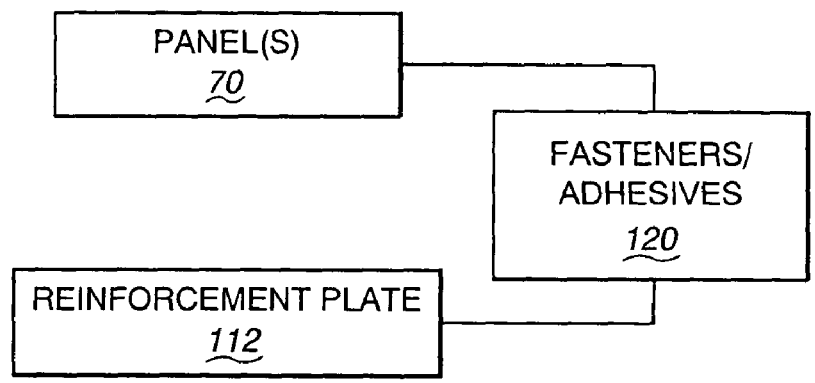
FIG. 13 is a schematic representation of one manner of connecting the reinforcement plates to a panel(s) on the inventive side post assemblies using fasteners/adhesives.
Figure 14:
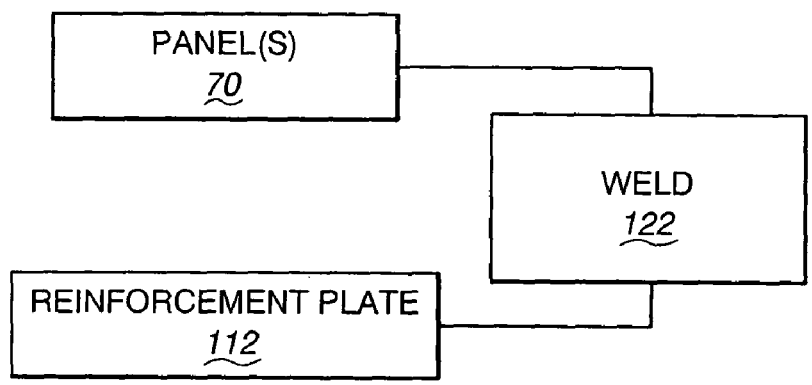
FIG. 14 is a schematic representation as in FIG. 14, wherein a weld is used to maintain the reinforcement plate and panel(s) together.

The reinforcement plate 112 may be secured in place by conventional, discrete, securable fasteners 118 that may be rivets, bolts, or other type of fastener known to those skilled in the art through pre-formed bores 119. As shown in FIG. 13, the invention contemplates that the reinforcement plate 112 may be secured to the panel(s) 70 by any type of fastener, or an adhesive, as shown generically at 120 in FIG. 13. Alternatively, as shown in FIG. 14, the enforcement plate 112 may be secured to the panel(s) 70 by a weld 122.

With the reinforcement plate 112 secured in place, logistics slots 124 can be formed through the combined thicknesses T, T1 defined by the panel(s) 70 and reinforcement plate 112. Accordingly, the region around each of the logistics slots 124 is rigidified, thereby allowing various cargo holding devices to be installed using the logistic slots 124 and positively braced without a likelihood of failure of the panel(s) 70. Relatively large bracing forces may thus be produced on cargo through such devices.

In this embodiment, the width W1 (FIG. 7) of the reinforcement plate 112 is less than the width W between the legs 88, 90 on the body 78 which overlies the reinforcement plate 112 i.e. is in lateral overlapping relationship therewith. The difference between the widths W and W1 may be such that tight tolerances are not required in manufacturing the reinforcement plates 112 and in installing the same.

The third identified location for the side post assemblies 72 may be where lateral edges of adjacent panels are butt-joined. This is not shown in the drawings. The side post assemblies 72 can be installed at this location in the same manner as described above.

The reinforcement plates 112 can be provided in association with each body 78 to extend over the full vertical length thereof. Alternatively, a single reinforcement plate 112 can be provided over only a portion of the length of the body 78. As a still further alternative, discrete reinforcement plates 112 can be provided at spaced lengthwise positions and/or edge-to-edge to strategically reinforce the regions around only some, or all, of the logistics slots 124.

Figure 9:
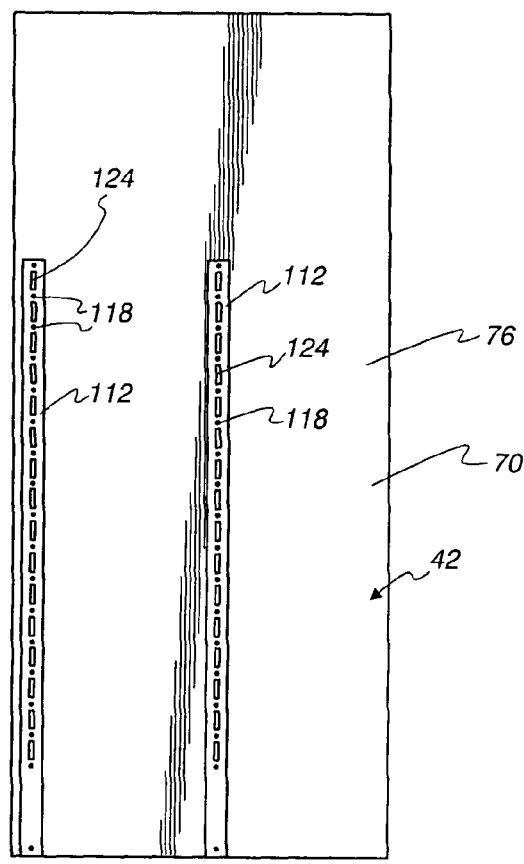
FIG. 9 is a reduced, fragmentary, elevation view of the outside of the panels on the side wall with the reinforcement plates thereon as shown in FIG. 8.
Figure 10:
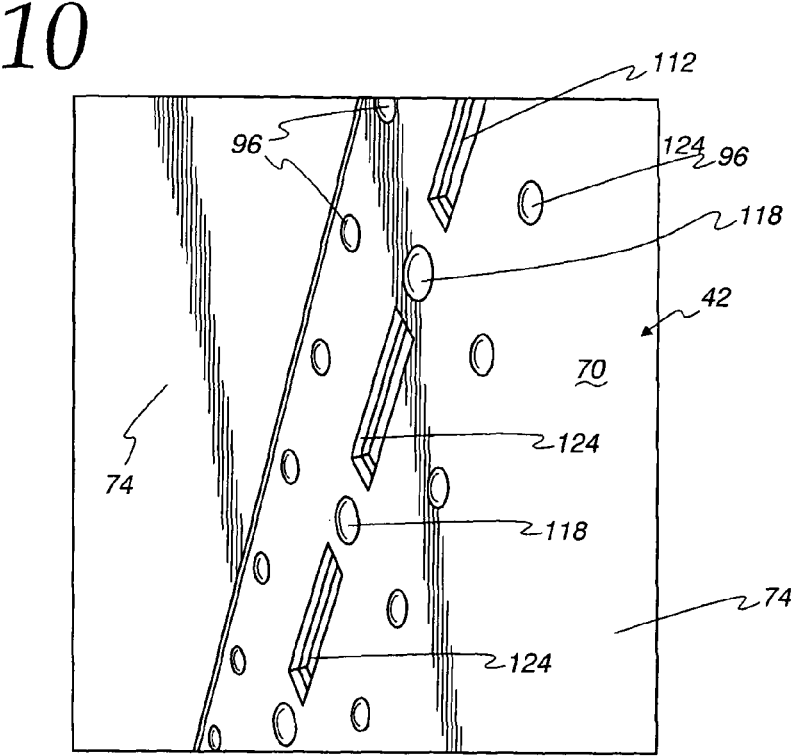
FIG. 10 is a fragmentary, perspective view of the inside of the side wall.
Figure 11:
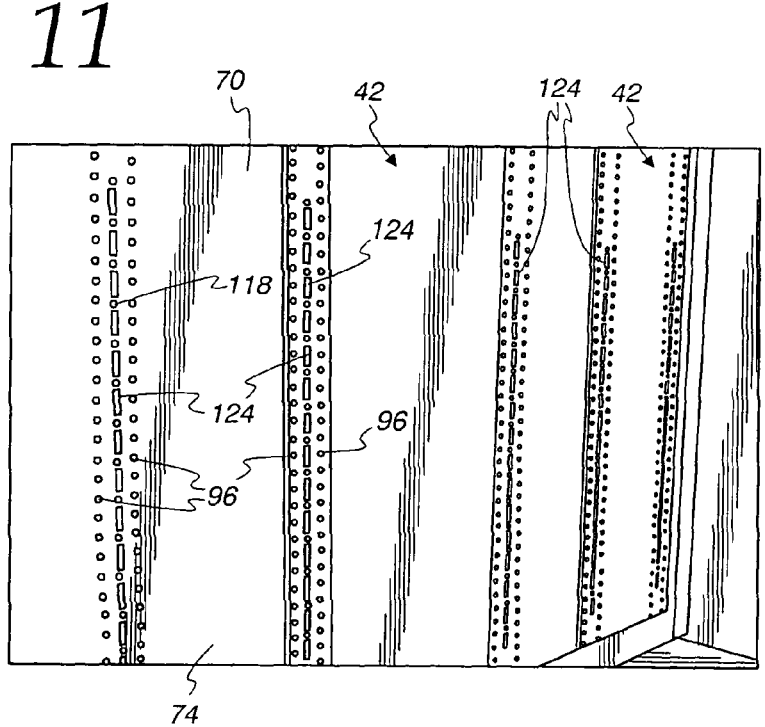
FIG. 11 is a reduced, prospective view of the inside of the side wall taken from a different perspective than in FIG. 10.
Figure 12:
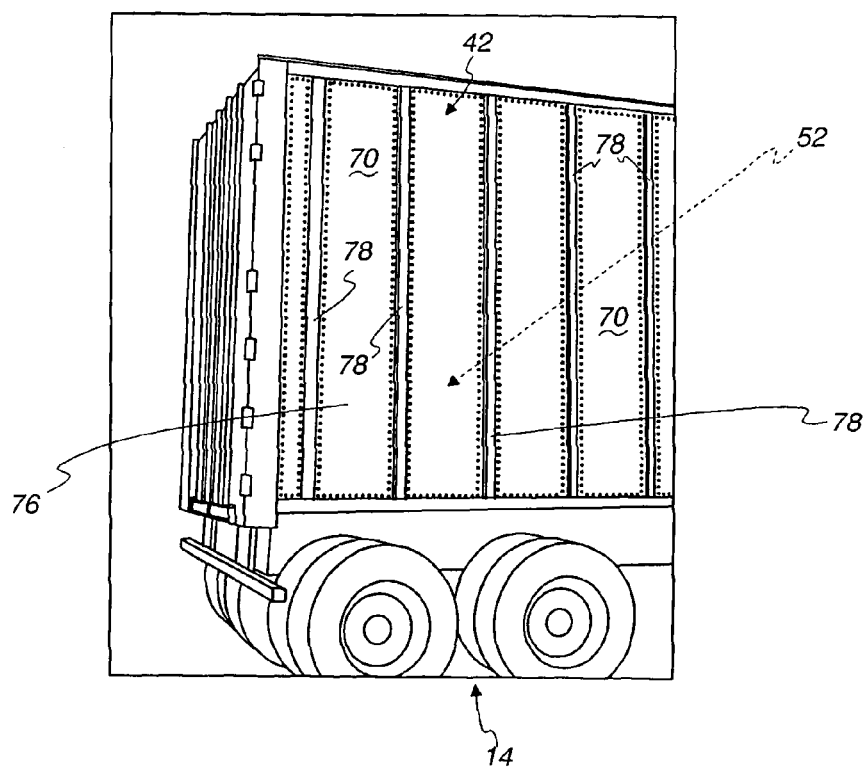
FIG. 12 is a reduced, fragmentary, perspective view of the semi trailer/van showing the outside of the side wall.

With the above-described construction, as seen particularly in FIGS. 9-11, the interior of the side wall 42 within the cargo space 52 has a smooth, flat construction with little interruption thereof. At the same time, the region around the logistics slots 124 is reinforced so that cargo control devices with high load capacity can be utilized to control heavy objects. Still further, the reinforcement plate 112 resides within the normal inside-out dimension of the body 78 so as not to require deepening of the "U" as would reduce the dimension of the cargo storage space 52.

Figure 15:
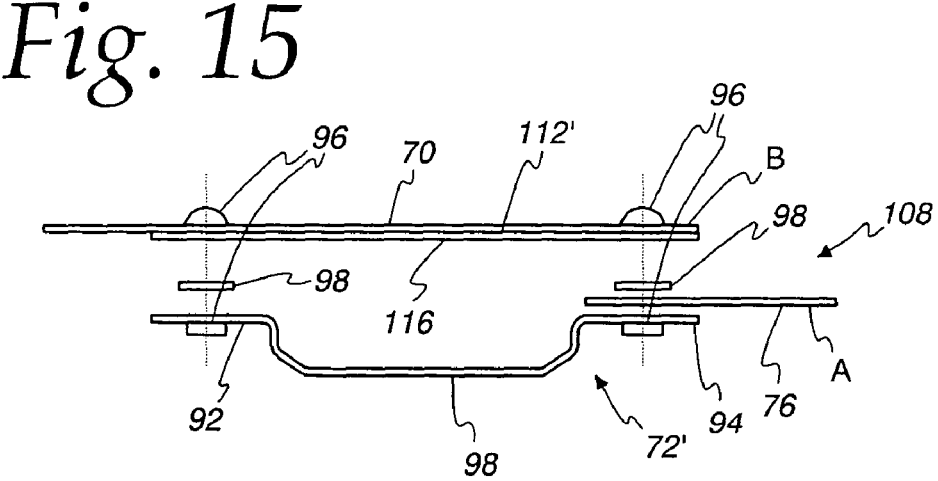
FIG. 15 is a view as in FIG. 6 with a modified/wider form of reinforcement plate.
Figure 16:
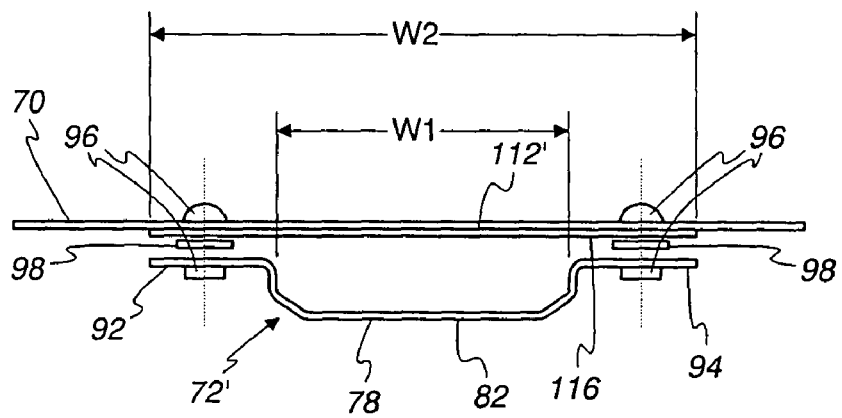
FIG. 16 is a view as in FIG. 7 with the modified form of reinforcement plate in FIG. 15.

In an alternative form of side post assembly 72' as shown in FIGS. 15 and 16, the reinforcement plate 112' is made with a width W2 that is greater than the aforementioned width W of the base 82 of the body 78. As a result, the reinforcement plate 112' is mounted to be captive between the flanges 92, 94 and the panel(s) 70. The fasteners 96 each extends through one of the flanges 92, 94, the reinforcement plate 112', and at least one of the panels 70. The width W2 is preferably approximately equal to the width of the body 78, but could be less than, or greater than, the width thereof.

In FIG. 16, the side post assembly 72', including the body 78 and reinforcement plate 112', is shown mounted on a single panel 70 with a continuous extent, corresponding to that shown in FIG. 7.

In FIG. 15, the side post assembly 72' is shown at a location corresponding to that in FIG. 6 at the lap joint 108. With this arrangement, the reinforcement plate 112' is captive between the panel 70 at B and the panel 70 at A, with the flange 94 abutted to the outside surface 76 of the panel 70 at A. The fasteners 96 extend through the flange 94, panels 70 at A and B and the reinforcement plate 112'. This particular order of stacking the layers might be changed, however.

The sealing composition 98 is preferably provided between the flanges 92, 94 and outside surface 116 of the reinforcement plate 112' to perform the same function as described previously in the other embodiments. In FIG. 15, the sealing composition 98 is situated between the panel 70 at A and the outside surface 116 of the reinforcement plate 112'.

The panel(s) 70 may be made from any of a number of different materials, with a range of different thicknesses. As just one example, the panels 70 may be made from 0.050 inch aluminum sheet material.

The thickness T1 of the reinforcement plate 112 may be the same as the thickness T of each panel 70. It may be desirable to make the thickness T1 greater than the thickness T for greater rigidity and strength of the region around the logistics slots 124.

The precise nature of the logistics slots 124 is not critical to the present invention. As an example, the logistics slots 124 may be "Series A"-type logistics slots on 4 inch vertical centers.

The inventive concept can be employed with any type of container having a floor and peripheral wall structures. Aside from that shown in FIGS. 1-3, the container may be used in the environment shown in FIGS. 22-26 in U.S. Pat. No. 7,066,529.

The foregoing disclosure of specific embodiments is intended to be illustrative of the broad concepts comprehended by the invention.

The invention claimed is:

1. A cargo container comprising:
    a floor; and
    a peripheral wall structure extending upwardly from the floor and bounding a cargo storage space,
    the peripheral wall structure comprising a plurality of side post assemblies of like construction including a first side post assembly,
    the peripheral wall structure further comprising a plurality of panels each having an inside surface facing the cargo storage space and an oppositely facing outside surface,
    the first side post assembly comprising a body with a vertically extending length,
    the body of the first side post assembly secured at the outside surface of at least one of the panels,
    the first side post assembly further comprising a reinforcement plate with oppositely facing first and second surfaces,
    the first surface facially abutted to the outside surface of the at least one panel,
    the body of the first side post assembly at least partially overlying the reinforcement plate,
    wherein a logistics slot is formed in one of the side post assemblies through the at least one panel and the reinforcement plate at a location where the reinforcement plate overlies the at least one panel.

2. The cargo container according to claim 1 wherein the body has a "U" shape as viewed in cross section taken transversely to the length of the body and comprises: a) a base with a width between laterally spaced first and second ends; b) first and second legs projecting respectively from the first and second base ends; and c) first and second flanges projecting laterally oppositely respectively from the first and second legs, the base and first and second legs cooperatively defining the "U" shape that opens towards the at least one panel.

3. The cargo container according to claim 2 wherein the reinforcement plate resides within the width of the base and is not engaged by the body.

4. The cargo container according to claim 2 wherein the reinforcement plate has a width greater than the width of the base and is captive between the first and second flanges and the at least one panel.

5. The cargo container according to claim 2 wherein there is a single piece of metal that is formed to define the base, the first and second legs, and the first and second flanges.

6. The cargo container according to claim 5 wherein the single piece is made from aluminum and the reinforcement plate is made from steel.

7. The cargo container according to claim 1 wherein the at least one panel has a first thickness and the reinforcement plate has a second thickness that is greater than the first thickness.

8. The cargo container according to claim 7 wherein the second thickness is in the range of 16-18 gauge.

9. The cargo container according to claim 1 wherein the reinforcement plate is secured to the at least one panel by one of: a) welding; b) discrete securable fasteners; and c) an adhesive.

10. The cargo container according to claim 1 wherein the reinforcement plate extends over only a portion of the length of the body.

11. The cargo container according to claim 1 wherein the reinforcement plate extends over substantially the entire length of the body.

12. The cargo container according to claim 1 wherein there are a plurality of reinforcement plates, the same as the first claimed reinforcement plate, that are spaced along the length of the body.

13. The cargo container according to claim 2 wherein the body is secured to the at least one panel by a plurality of discrete, securable fasteners.

14. The cargo container according to claim 4 wherein a sealing component is provided between at least one of: a) the reinforcement plate and the at least one panel; and b) the body and the reinforcement plate.

15. The cargo container according to claim 3 wherein the at least one panel comprises first and second panels overlapped at a joint and the first flange is secured at the joint.

16. The cargo container according to claim 4 wherein the at least one panel comprises first and second panels overlapped at a joint and the reinforcement plate is captive between: a) the first panel; and b) the second panel and first flange at the joint.

17. The cargo container according to claim 16 wherein a sealing component is provided between the reinforcement plate and second panel.

18. The cargo container according to claim 1 wherein the cargo container further comprises a wheeled carriage beneath the floor.

19. The cargo container according to claim 18 in combination with a powered towing component.

* * * * *